(12) United States Patent
Li et al.

(10) Patent No.: US 7,015,893 B2
(45) Date of Patent: Mar. 21, 2006

(54) PHOTOLUMINESCENT ELECTROPHORETIC DISPLAY

(75) Inventors: Zili Li, Barrington, IL (US); Zane Coleman, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 385 days.

(21) Appl. No.: 10/356,003

(22) Filed: Jan. 31, 2003

(65) Prior Publication Data

US 2004/0150613 A1    Aug. 5, 2004

(51) Int. Cl.
*G09G 3/34* (2006.01)
*G03G 17/04* (2006.01)

(52) U.S. Cl. .......................................... 345/107; 430/32
(58) Field of Classification Search ................ 345/107; 359/296; 250/458.1, 461.1; 430/32
See application file for complete search history.

(56) References Cited

U.S. PATENT DOCUMENTS

| | | | | |
|---|---|---|---|---|
| 3,668,106 A | * | 6/1972 | Ota ............................ | 358/305 |
| 3,756,693 A | * | 9/1973 | Ota ............................ | 345/107 |
| 6,067,185 A | * | 5/2000 | Albert et al. ............... | 359/296 |
| 6,262,833 B1 | * | 7/2001 | Loxley et al. .............. | 359/296 |
| 6,323,989 B1 | * | 11/2001 | Jacobson et al. ........... | 359/296 |
| 6,327,072 B1 | * | 12/2001 | Comiskey et al. .......... | 359/296 |
| 6,392,786 B1 | * | 5/2002 | Albert ........................ | 359/296 |
| 6,721,083 B1 | * | 4/2004 | Jacobson et al. ........... | 359/296 |
| 6,822,782 B1 | * | 11/2004 | Honeyman et al. ......... | 359/296 |
| 6,842,279 B1 | * | 1/2005 | Amundson .................. | 359/296 |
| 2002/0180687 A1 | * | 12/2002 | Webber ...................... | 345/107 |
| 2002/0185378 A1 | * | 12/2002 | Honeyman et al. ......... | 204/601 |
| 2003/0011560 A1 | * | 1/2003 | Albert et al. ............... | 345/107 |
| 2003/0112491 A1 | * | 6/2003 | Albert et al. ............... | 359/296 |
| 2003/0132908 A1 | * | 7/2003 | Herb et al. ................. | 345/107 |
| 2003/0137717 A1 | * | 7/2003 | Albert et al. ............... | 359/296 |
| 2005/0035941 A1 | * | 2/2005 | Albert et al. ............... | 345/107 |

\* cited by examiner

*Primary Examiner*—Ryan Yang

(57) ABSTRACT

Electrophoretic displays (100, 400) comprise suspensions in one or more bodies of liquid (116, 418, 426) of reflective particles (118, 420), and photoluminescent particles (120, 422). The one or more bodies of liquid are located between a front wall (104, 402) and a back wall (102, 404). Electrodes (128, 129, 410, 412) and optionally a transparent ground plane layer (124) are provided for applying electric fields to the suspensions according to image information. The reflective particles and the photoluminescent particles are characterized by the electrophoretic mobilities of the same sign, and therefore move in the same direction in response to applied fields. A source of radiation (140, 428) capable of exciting photoluminescence of the photoluminescent particles is optically coupled to the liquid suspensions. An optical filter layer is optionally located at the front of the displays. The display is capable of operating under a wide range of ambient light conditions.

20 Claims, 1 Drawing Sheet

PHOTOLUMINESCENT ELECTROPHORETIC DISPLAY

BACKGROUND OF THE INVENTION

1. Field of the Invention

The present invention relates in general to displays. More particularly, the present invention relates to electrophoretic displays.

2. Description of Related Art

Proliferation of computers, and other electronic devices, such as for example advanced wireless telephones, personal digital assistants (PDA), electronic games, and new types of television monitors have increased the importance of display technologies.

Cathode Ray Tubes (CRT) and Liquid Crystal Displays (LCD) are the two most common types of displays. CRT displays are presently dominant. LCD displays have the advantage that they are essentially 'flat', having a small depth compared to the dimensions of the viewable area. The flatness of LCD displays compared to traditional CRT displays makes them especially suitable for use in small size portable devices, such as notebook computers, PDAs, and wireless telephones, and is also attractive for larger home entertainment, and commercial displays.

Flatness is a generally regarded as a positive attribute in display technology, and there are other types of displays, aside from LCD displays, that are flat. One other type of flat display technology is electrophoretic. Electrophoretic displays comprise a suspension of particles in a liquid. The suspension is held between two flat walls, one of which is transparent and serves as a viewable display surface. Optionally the suspension is encapsulated in many small capsules that are held between the two flat walls, or emulsified in a polymeric matrix. The particles have optical properties that are different from the liquid in which they are suspended. For example electrophoretic displays in which the particles are more reflective of light than the liquid have been proposed and electrophoretic displays in which the particles are luminescent have also been proposed. Each type is suited to use under particular ambient light conditions. Due to the electrochemical properties of the particles, and of the liquid, the particles spontaneously acquire a net charge when placed in the liquid. Having a charge, the particles can be caused to translate by an externally applied electric field. Electrodes are provided for imagewise application of electric fields to the suspension. Selectively causing the particles to translate to the viewable display surface, according to an image pattern, causes an image to appear at the viewable display surface. In as much as electrophoretic displays work by application of electric fields, they are potentially very efficient in terms of current consumption, which is a significant attribute for battery operated portable electronic devices.

Certain display applications, such as portable electronic devices, typically require that a display be able to operate in a wide range of ambient light conditions, i.e., in conditions ranging from mid day sun, to complete darkness.

It would be desirable to have an electrophoretic display that is capable of operating in wide range of ambient light conditions.

BRIEF DESCRIPTION OF THE FIGURES

The present invention will be described by way of exemplary embodiments, but not limitations, illustrated in the accompanying drawings in which like references denote similar elements, and in which.

DETAILED DESCRIPTION OF THE PREFERRED EMBODIMENTS

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

Figure 1:
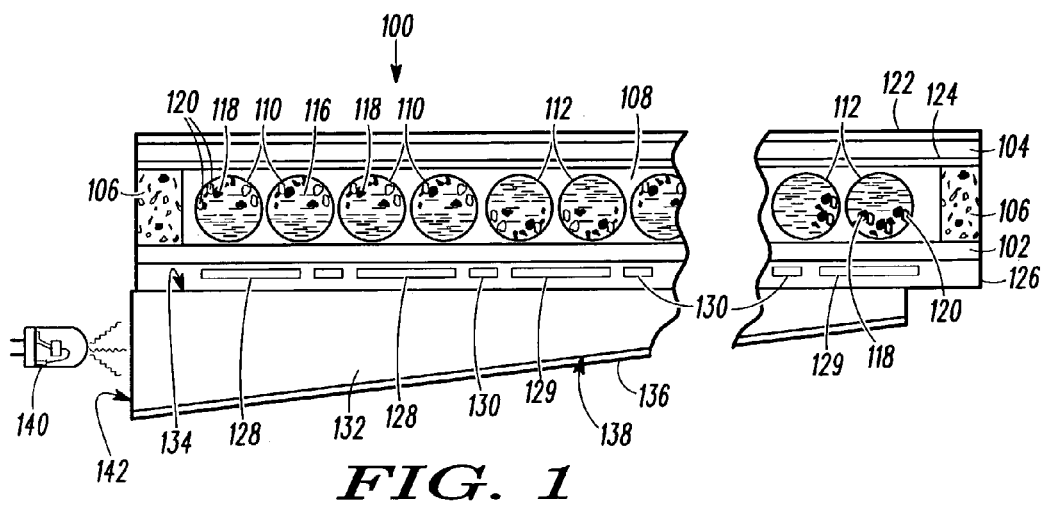
FIG. 1 is a sectional elevation view of an electrophoretic display according to the preferred embodiment of the invention.

FIG. 1 is a sectional elevation view of an electrophoretic display 100 according to the preferred embodiment of the invention. The electrophoretic display 100 comprises a back wall 102, and a light transmissive front wall 104 that is spaced from the back wall 102. A sealant 106 bonds, and seals the perimeters of the walls 102, 104 forming a chamber 108 between the walls 102, 104.

A plurality of capsules 110, 112 are located in the chamber 108. Each of the capsules 110, 112, encloses a liquid 116, a first plurality of reflective particles 118 that are reflective of at least a portion of the visible spectrum, and are preferably white i.e., reflective across the visible spectrum, and a second plurality of photoluminescent particles 120. The particles 118, 120 are suspended in the liquid 116. The photoluminescent particles 120 preferably comprise phosphors. The reflective particles 118 and the photoluminescent particles 120 are characterized by electrophoretic mobility of the same sign, so that under the influence of a given field, the reflective particles 118, and the photoluminescent particles 120 move in the same general direction. The liquid 116 is transmissive of radiation capable of exciting photoluminescence of the photoluminescent particles 120, and preferably blocks light that is emitted by the photoluminescent particles 120. The liquid 116 preferably absorbs visible light. The liquid 116 preferably comprises a nigrosin solution. Alternatively, instead of using capsules 110, 112, the liquid 116, and particles 118, 120 are emulsified in a polymeric matrix.

The back wall 102 is transmissive of at least radiation capable of exciting the photoluminescent particles 120, and the front wall 104 is transmissive of at least a portion of a spectrum emitted by the photoluminescent particles 120. The front wall is also transmissive of at least a portion of a spectrum reflected by the reflective particles 118.

An optical filter layer 122 is supported on the front wall 104. The optical filter is transmissive of at least a portion of the visible spectrum. In particular, the optical filter layer 122 is transmissive of at least a portion of the spectrum emitted by the photoluminescent particles 120, and at least a portion of the spectrum reflected by the reflective particles 118. The optical filter layer 122 blocks (either by reflection or absorption) radiation capable of exciting the photoluminescent particles 120. Alternatively, the optical filter 122 is eliminated and a front wall 104 is made from a material that has the optical properties of the optical filter layer 122. Alternatively, optical filter 122 is eliminated and the front wall made of a material that is transmissive of optical radiation capable of exciting the photoluminescent particles 120.

A transparent ground plane layer 124 is also supported on the front wall 104, opposite the optical filter 122, facing chamber 108. The transparent ground plane layer 124 is transmissive of at least a portion of the spectrum emitted by the photoluminescent particles 120 and at least a portion of the spectrum reflected by the reflective particles 118. The transparent ground plane layer 124 can for example comprise indium tin oxide (ITO), or a conductive transparent polymer such as poly (3,4) ethylenedioxythiophene/polystyrenesulfone acid (PEDOT/PSS) sold under the trade name ORGACON™ by Agfa of Ridgefield Park, N.J. Alternatively, the functions of the transparent ground plane layer 124, and the optical filter layer 122 are combined in a single layer. The relative positions of the transparent ground plane layer 124, the optical filter layer 122, and the front wall 104 are alternatively altered from what is shown in FIG. 1.

An active matrix 126 is supported on the back wall 102 opposite the chamber 108. Alternatively, the active matrix 126 is supported on the back wall 102 facing the chamber 108. The active matrix 126 comprises a rectangular array of pixel electrodes 128, 129 row conductors 130, column conductors (not shown), and thin film transistors (not shown). By application of signals to the individual row conductors 130, and individual column conductors voltages on the pixel electrodes 128, 129 (relative to the transparent ground plane layer 124) are controlled. The pixel electrodes 128, 129 are transmissive of radiation capable of exciting photoluminescence of the photoluminescent particles 120. The pixel electrodes 128, 129 preferably comprise ITO or PEDOT/PSS.

An optical coupling element 132 in the form of a wedge of transmissive material is located at the back of the electrophoretic display 100. An output surface 134 of the optical coupling element 132 abuts the active matrix 126. In the alternative case that the active matrix faces the chamber 108, the output surface 134 abuts the back wall 102. A reflective layer 136 is located on a canted surface 138 of the optical coupling element 132 that is opposite the output surface 134. One or more sources of radiation 140 (one shown) capable of exciting photoluminescence of the photoluminescent particles 120 faces an input surface 142 of the optical coupling element 132. The source of radiation 140 preferably comprises an ultraviolet emitting diode that emits radiation including radiation in the range of 370 to 405 nanometers. Ultraviolet emitting diodes are efficient low power sources of ultraviolet radiation. Radiation emitted by the source of radiation 140 transmits through the input surface 142, is reflected by the canted surface 138, and propagates through the output surface 134, through the pixel electrodes 128, 129 through the back wall 102, through the liquid 116 to the photoluminescent particles 120. Thus, the photoluminescent particles 120 are optically coupled to the source of radiation 142 through the pixel electrodes 128, 129 which are transmissive of radiation capable of exciting photoluminescence of the photoluminescent particles 120. Alternatively, other types of optical coupling elements or more elaborate optical coupling arrangements that include multiple optical coupling elements are used in lieu of the optical coupling element 132 shown in FIG. 1.

The photoluminescent particles 120 preferably comprise a phosphor that is efficiently excited by radiation that is efficiently produced by a diode. In particular, the photoluminescent particles 120 preferably comprise one or more of the following phosphors: $(Ba_{1-X-Y-Z}, Ca_X, Sr_Y, Eu_Z)_2(Mg_{1-W}, Zn_W)Si_2O_7$, where $X+Y+Z<=1, Z>0$; and $0.05<=W<=0.50$; $(Sr_X, Ba_Y, Ca_Z)_5(PO_4)_3Cl:Eu^{2+}$ where $X+Y+Z=1$; and/or $Y_2O_3:Eu^{3+}, Bi^{3+}$. The foregoing phosphors are excited efficiently by radiation in the range of 370 to 405 nanometers which can be efficiently produced by diodes such as ultraviolet diode 140.

The optical filter layer 122 protects users from radiation emitted by the ultraviolet diode 140. The optical filter layer 122 also serves to shield the photoluminescent particles 120 from solar ultraviolet radiation.

In operation, ultraviolet diode 140 is powered causing the ultraviolet diode 140 to emit radiation that impinges on the photoluminescent particles 120, causing the photoluminescent particles 120 to emit visible light. Optionally the ultraviolet diode is powered, in response to a signal from a photodetector (not shown), only under low ambient light conditions. Electrical signals are applied to the row conductors 130 and column conductors (not shown) in order to selectively apply potentials to the pixel electrodes 128, 129 in order to cause the reflective 118, and photoluminescent 120 particles to move toward or away from the front wall 104.

At least two extreme states are useful in displaying information with the display 100. In a first state corresponding to a first group of capsules 110, and pixel electrodes 128 in FIG. 1, the reflective particles 118, and the photoluminescent particles 120 are located at the front wall 104. In the first state ambient light that is transmitted through the front wall 104 is reflected by the reflective particles 118 back through the front wall 104. Also, in the first state the photoluminescent particles 120 photoluminesce and emit visible light which is transmitted through the front wall 104.

In a second state corresponding to a second group of capsules 112 and pixel electrodes 129 in FIG. 1, the reflective particles 118, and the photoluminescent particles 120 are located near the back wall 102. In the second state ambient light transmitted through the front wall 104 will be absorbed by the liquid 116, and consequently will not be reflected by the reflective particles 118. Also, in the second state light emitted by the photoluminescent particles 120 will be absorbed by the liquid 116 and will not be transmitted through the front wall 104.

By controlling the voltages applied to the pixel electrodes 128 129 according to image information, images are caused to appear on the display 100 which is viewed by looking toward the front wall 104. Having reflective particles 118, and photoluminescent particles 120 that move in the same direction in response to applied fields allows the display 100 to display information under high ambient light conditions, in total darkness and under intermediate ambient light conditions. In conditions of lower intensity ambient light, photoluminescence of the photoluminescent particles 120 makes a dominant contribution to displaying of information, and in high ambient light conditions, the reflective particles 118 make a dominant contribution to displaying image information. The display 100 is operable under a wide range of ambient light conditions, and does not require drive signals applied to the pixel electrodes 128, 129 to be changed according to the ambient light conditions. The display 100 does not suffer from contrast reversal when operated under different lighting conditions.

Preferably, the ratio by surface area of the reflective particles 118 to the photoluminescent particles 120 is at least one-to-one.

The display 100 is alternatively made into a color display by adding color filters adjacent the front wall 104, and driving the pixel electrodes 128, 129 according to color image signals. Alternatively, the display 100 is made into a color display by locating reflective particles 118 that reflect different colors (e.g., red, blue and green), and photoluminescent particles 120 that emit different colors over specific pixel electrodes 128, 129.

Figure 2:
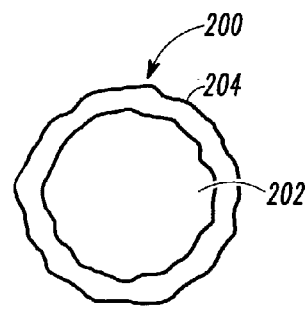
FIG. 2 is a cross section of a photoluminescent particle used in the display according to an alternative embodiment of the invention.

FIG. 2 is a cross section of a photoluminescent particle 200 used in the display 100 according to an alternative embodiment of the invention. The photoluminescent particle 200 comprises a core 202, and a coating of photoluminescent material 204 on the core 202. In this embodiment the core 202 preferably comprises the same material e.g., titanium oxide, that is included in reflective particles, e.g., 118 with which the photoluminescent particle 200 is used.

Figure 3:
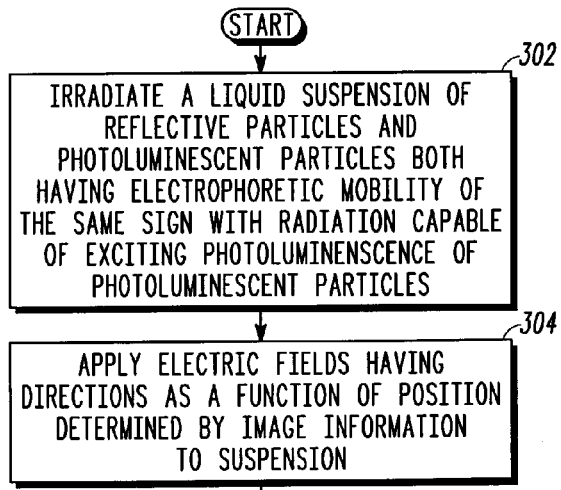
FIG. 3 is a flow chart of a method of forming an image according to the preferred embodiment of the invention.

FIG. 3 is a flow chart of a method 300 of forming an image according to the preferred embodiment of the invention. In step 302 a liquid suspension of reflective particles e.g., 118 and photoluminescent particles e.g., 120 having electrophoretic mobility of the same sign is irradiated with radiation capable of exciting photoluminescence of the photoluminescent particles e.g., 120. The liquid of the suspension irradiated in step 302 is preferably transmissive of the radiation with which the suspension is irradiated, and preferably blocks light emitted by the photoluminescent particles e.g., 120, and light that the reflective particles e.g., 118 can reflect. In step 304 electrical fields having directions as a function of position that are determined by image information are applied to the suspension irradiated in step 302. Although shown in sequence, steps 302, and 304 preferably occur concurrently.

Figure 4:
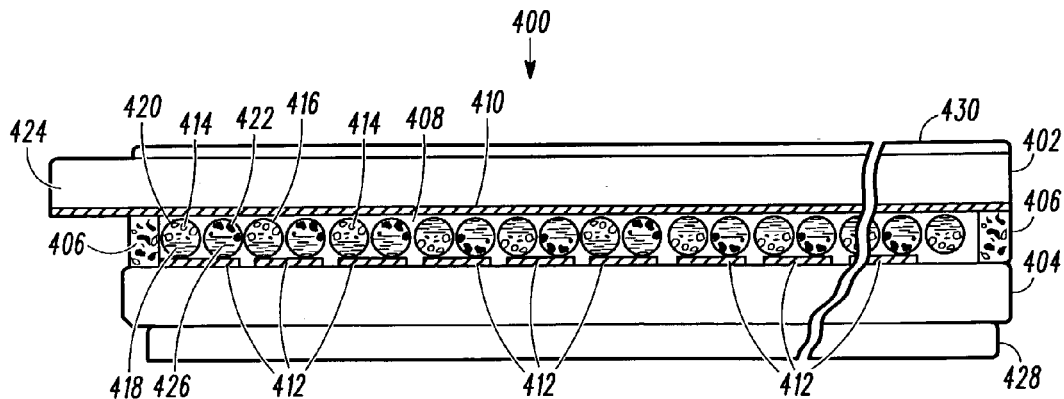
FIG. 4 is a sectional elevation view of an electrophoretic display according to an alternative embodiment of the invention.

FIG. 4 is a sectional elevation view of an electrophoretic display 400 according to an alternative embodiment of the invention. The electrophoretic display 400 comprises a top wall 402, and a bottom wall 404 that are bonded near their peripheries by a sealant 406 forming a chamber 408.

A first plurality of capsules of a first type 414, and a second plurality of capsules of a second type 416 are located in the chamber 408. The capsules of the first type 414 enclose a first type fluid 418 in which a plurality of reflective particles 420 are suspended. The capsules of the second type 416 enclose a second type fluid 426 in which a plurality of photoluminescent particles 422 are suspended. The reflective particles 420 and the photoluminescent particles 422 are characterized by electrophoretic mobility of the same sign. Using separate capsules 414, 416 enclosing the different type fluids 418, 426 allows the fluids 418, 426 to be optimized (e.g., optically, as to specific gravity, and electrochemically) for each type of particle 420, 422.

A plurality of parallel elongated row electrodes 410 (only one of which is visible in FIG. 4) are formed on the top wall 402 facing the chamber 408. Similarly, a plurality of parallel elongated column electrodes 412 are formed on the bottom wall 404 facing the chamber 408. The row electrodes 410 extend to an edge portion 424 of the top wall 402 where a connection is made to an external driver circuit (not shown). A similar extension of bottom wall (out of the plane of FIG. 4) is provided.

Pixel areas are defined by the overlap of crossing row electrodes 410, and column electrodes 412. The row electrodes 410 and the column electrodes 412 are conductive. The row electrodes 410 and the column electrodes 412 are used to apply electric fields to the pixel areas in order to induce electrophoresis of the reflective 420, and photoluminescent particles 422 within the first type 418, and second type 426 fluids respectively. Although as shown in FIG. 4 the size of the capsules 414, 416 is such that about two capsule diameters span the width of each of the column electrodes 412, the capsules 414, 416 are preferably substantially smaller than the widths of the row 410, column electrodes 412, so that in the case of a random mix of capsules of the first 414, and second 416 types there will be approximately proportionate numbers of capsules of both types in each pixel area. The scale of the capsules 414, 416 shown in FIG. 4 is used in the interest of clearly illustrating the capsules 414, 416 their contents.

An ultraviolet electroluminescent lamp 428 is located adjacent the back wall 404, opposite the chamber 408. The ultraviolet lamp 428 emits radiation that is capable of exciting photoluminesce of the photoluminescent particles 422. The ultraviolet electroluminescent lamp 428 offers the advantage, especially for use in the electrophoretic display 400, of flatness.

An optical filter layer 430 is located on the front wall 402 opposite the chamber 408. The optical filter layer 430 serves a function analogous to the optical filter layer 122 shown in FIG. 1.

The column electrodes 412 and the second type fluid 426 is transmissive of radiation capable of exciting photoluminescence of the photoluminescent particles 422. The first type fluid 418 absorbs light that the reflective particles 420 are capable of reflecting. The second type fluid 426 absorbs light emitted by the photoluminescent particles 422. The row electrodes 410 are transmissive of at least a portion of the spectrum emitted by the photoluminescent particles 422, and at least a portion of the spectrum reflected by the reflective particles 420.

An active matrix driving scheme is illustrated in FIG. 1, and a passive matrix driving scheme (using row 410, and column 412 electrodes) is illustrated in FIG. 4. Alternatively, a direct drive driving scheme is used. A direct drive driving scheme is especially suitable for activating predetermined pattern indicia, such as for example a seven segment display and/or a display including predetermined graphical icons. A direct drive display preferably includes one or more electrodes shaped according to indicia to be displayed.

Alternatively, in lieu of the reflective particles 118, shown in FIG. 1, and the reflective particles 420, shown in FIG. 4, smaller capsules that enclose reflective particles and move within the capsules 110, 112 shown in FIG. 1 or the capsules 414 shown in FIG. 4 are used. Also alternatively, in lieu of the photoluminescent particles 120 shown in FIG. 1, and the photoluminescent particles 422 shown in FIG. 4, smaller capsules that enclose photoluminescent particles, or photoluminescent dye, and move within the capsules 110, 112 shown in FIG. 1, or the capsules 414, 416 shown in FIG. 4 are used. Particles or such aforementioned smaller capsules are cohesive bodies. Such cohesive bodies are cohesive in as much as they are chemically, and physically stable in a liquid in which they are suspended, which implies that they do not break down. Whether particle or small capsule, in any particular embodiment the reflective cohesive bodies, and the photoluminescent cohesive bodies are characterized by electrophoretic mobility of the same sign.

According to another alternative particles, rather than using separate reflective and photoluminescent particles, cohesive bodies that comprise phosphor particles that are both photoluminescent and reflective are used. For example particles such as shown in FIG. 2 that are both photoluminescent and reflective can be used.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. An electrophoretic display comprising:
a first wall; and
a second light transmissive wall spaced from the first wall;
one or more bodies of liquid located between the first wall and the second wall;
a plurality of first cohesive bodies that are light reflective and are characterized by electrophoretic mobility of a particular sign suspended In at least a subset of the one or more bodies of liquid;
a plurality of second cohesive bodies that are photoluminescent and are characterized by electrophoretic mobility of the particular sign suspended in at least a subset of the one or more bodies of liquid;
one or more electrodes located proximate the one or more bodies of liquid for imagewise application of electric fields to the one or more bodies of liquid; and
a source of radiation capable of exciting photoluminescence of the plurality of second cohesive bodies optically coupled to the plurality of second cohesive bodies,
wherein the liquid is transmissive of radiation capable of exciting photoluminescence of the second cohesive bodies, and blocks radiation emitted by photoluminescence of the second cohesive bodies, and
wherein the liquid comprises nigrosin.

2. An electrophoretic display comprising:
a first wall; and
a second light transmissive wall spaced from the first wall;
one or more bodies of liquid located between the first wall and the second wall;
a plurality of first cohesive bodies that are light reflective and are characterized by electrophoretic mobility of a particular sign suspended in at least a subset of the one or more bodies of liquid;
a plurality of second cohesive bodies that are photoluminescent and are characterized by electrophoretic mobility of the particular sign suspended in at least a subset of the one or more bodies of liquid;
one or more electrodes located proximate the one or more bodies of liquid for imagewise application of electric fields to the one or more bodies of liquid; and
a source of radiation capable of exciting photoluminescence of the plurality of second cohesive bodies optically coupled to the plurality of second cohesive bodies,
wherein the one or more electrodes comprise an array of electrodes that are transmissive of radiation capable of exciting photoluminescence of the second cohesive bodies, and
wherein the source of radiation is optically coupled to the second plurality of cohesive bodies through the array of electrodes.

3. The electrophoretic display according to claim 2 wherein:
the array of electrodes comprise indium tin oxide.

4. The electrophoretic display according to claim 2 wherein:
the array of electrodes comprises a transparent conductive polymer.

5. The electrophoretic display according to claim 2 wherein:
the source of radiation comprises an emitting diode that emits radiation in the range of 370 to 405 nanometers; and the second cohesive bodies comprise one or more phosphors selected from the group consisting of:
$(Ba_{1-x-y-z},Ca_X,Sr_Y,Eu_Z)_2(Mg_{1-w},Zn_W)Si_2O_7$,
wherein
$X+Y+Z<=1$;
$Z>0$; and
$0.05<=W<=0.50$;
$(Sr_X,Ba_Y,Ca_Z)_5(PO_4)_3Cl:Eu^{2+}$;
wherein:
$X+Y+Z=1$; and
$Y_2O_3:Eu^{3+},Bi^{3+}$.

6. The electrophoretic display according to claim 2 further wherein:
the army of electrodes is located proximate the first wall; and
the electrophoretic display further comprises:
an optical filter layer that transmits light in the visible portion of the spectrum; and blocks radiation capable of exciting photoluminescence of the second cohesive bodies said optical filter layer located proximate the second light transmissive wall.

7. An electrophoretic display comprising:
a first wall; and
a second light transmissive wall spaced from the first wall;
one or more bodies of liquid located between the first wall and the second wall;
a plurality of visible light reflecting, photoluminescent cohesive bodies suspended in the one or more bodies of liquid, said reflecting, photoluminescent cohesive bodies comprising reflective phosphor particles;
one or more electrodes located proximate the one or more bodies of liquid for imagewise application of electric fields to the one or more bodies of liquid; and
a source of radiation capable of exciting photoluminescence of the plurality of visible light reflecting, photoluminescent cohesive bodies optically coupled to the plurality of visible light reflecting, photoluminescent cohesive bodies; and
an optical filter layer that transmits light in the visible portion of the spectrum; and blocks radiation capable of exciting photoluminescence of the light reflecting, photoluminescent cohesive bodies said optical filter layer located proximate the second light transmissive wall.

8. An electrophoretic display comprising:
a first wall; and
a second light transmissive wall spaced from the first wall;
one or more bodies of liquid located between the first wall and the second wall;
plurality of visible light reflecting, photoluminescent cohesive bodies suspended in the one or more bodies of liquid, said reflecting, photoluminescent cohesive bodies comprising reflective phosphor particles;
one or more electrodes located proximate the one or more bodies of liquid for imagewise application of electric fields to the one or more bodies of liquid; and
a source of radiation capable of exciting photoluminescence of the plurality of visible light reflecting, photoluminescent cohesive bodies optically coupled to the plurality of visible light reflecting, photoluminescent cohesive bodies, wherein the liquid is transmissive of radiation capable of exciting photoluminescence of the light reflecting, photoluminescent cohesive bodies, and blocks radiation emitted by photoluminescence of the light reflecting, photoluminescent cohesive bodies, and wherein the liquid comprises nigrosin.

9. An electrophoretic display comprising:

a first wall; and a second light transmissive wall spaced from the first wall;

one or more bodies of liquid located between the first wall and the second wall;

a plurality of visible light reflecting, photoluminescent cohesive bodies suspended in the one or more bodies of liquid, said reflecting, photoluminescent cohesive bodies comprising reflective phosphor particles;

one or more electrodes located proximate the one or more bodies of liquid for imagewise application of electric fields to the one or more bodies of liquid; and a source of radiation capable of exciting photoluminescence of the plurality of visible light reflecting, photoluminescent cohesive bodies optically coupled to the plurality of visible light reflecting, photoluminescent cohesive bodies, wherein the one or more electrodes comprise an array of electrodes that are transmissive of radiation capable of exciting photoluminescence of the light reflecting, photoluminescent cohesive bodies; and the source of radiation is optically coupled to the light reflecting, photoluminescent cohesive bodies through the array of electrodes.

10. The electrophoretic display according to claim 9 wherein:

the array of electrodes comprise indium tin oxide.

11. The electrophoretic display according to claim 9 wherein:

the array of electrodes comprises a transparent conductive polymer.

12. The electrophoretic display according to claim 2, wherein the plurality of second cohesive bodies comprise core particles that are coated with photoluminescent material.

13. The electrophoretic display according to claim 2, wherein a ratio of the surface area of the plurality of first cohesive bodies to the surface area of the plurality of second cohesive bodies is at least one to one.

14. The electrophoretic display according to claim 2, wherein the source of radiation comprises an electroluminescent lamp.

15. The electrophoretic display according to claim 2, wherein the liquid is transmissive of radiation capable of exciting photoluminescence of the second cohesive bodies, and blocks radiation emitted by photoluminescence of the second cohesive bodies.

16. The electrophoretic display according to claim 2, wherein the source of radiation comprises an emitting diode that emits radiation in the range of 320 to 405 nanometers.

17. The electrophoretic display according to claim 2, wherein the first wall transmits ultraviolet light.

18. The electrophoretic display according to claim 2, wherein the second wall substantially blocks ultraviolet light.

19. The electrophoretic display according to claim 2, wherein the plurality of second cohesive particles comprise core particles that are reflective in the visible spectrum.

20. The electrophoretic display according to claim 19, wherein the first cohesive particles and the core particles comprise titanium oxide.

* * * * *